United States Patent [19]

Budzich

[11] 4,002,028
[45] Jan. 11, 1977

[54] HYDROSTATIC TRANSMISSION MIXED LOOP SYSTEM

[76] Inventor: Tadeusz Budzich, 80 Murwood Drive, Moreland Hills, Ohio 44022

[22] Filed: Apr. 5, 1976

[21] Appl. No.: 674,036

Related U.S. Application Data

[63] Continuation-in-part of Ser. No. 554,619, March 3, 1975, Pat. No. 3,962,872.

[52] U.S. Cl. .................... 60/453; 60/456; 60/464; 60/465; 60/466; 91/420
[51] Int. Cl.² .................. F15B 15/18; F15B 21/04
[58] Field of Search ............ 60/453, 454, 456, 464, 60/465, 466, 476, 486, 487; 91/420

[56] References Cited

UNITED STATES PATENTS

| | | | |
|---|---|---|---|
| 2,059,155 | 10/1936 | Thoma ................... | 60/464 |
| 2,961,829 | 11/1960 | Weisenbach ............. | 60/464 |
| 3,236,049 | 2/1966 | Reinke .................. | 60/456 UX |
| 3,866,421 | 2/1975 | Kersten et al. .......... | 60/456 |
| 3,866,422 | 2/1975 | Kersten ................. | 60/456 |
| 3,925,987 | 12/1975 | Faisandier .............. | 60/464 |

Primary Examiner—Edgar W. Geoghegan

[57] ABSTRACT

A mixed loop hydrostatic transmission circuit for use principally with orbit, gear, vane and other non-piston type motors, which generate contaminants making them less suitable for applications using conventional closed loop hydrostatic transmission circuits. The mixed loop hydrostatic transmission drive retains the precise load control and high efficiency of a closed loop system, while introducing the benefits of contamination control of open loop hydrostatic transmission circuits. While maintaining the speed of the motor proportional to the output flow of the pump, both in positive and regenerative modes of operation, the flow of fluid is diverted from the motor to an injector type inlet booster connected to the reservoir, which supplies the full flow of fluid, required by the pump.

10 Claims, 4 Drawing Figures

HYDROSTATIC TRANSMISSION MIXED LOOP SYSTEM

This is a continuation in part of application Ser. No. 554,619 filed Mar. 3, 1975 for Hydrostatic Transmission Mixed Loop System, which issued as U.S. Pat. No. 3,962,872 on June 15, 1976.

BACKGROUND OF THE INVENTION

This invention relates generally to hydrostatic transmission drives. The term hydrostatic transmission is usually associated with highly developed and highly specialized components of closed loop systems, principally intended for precise control of a single load. In a closed loop system, fluid at a very high rate of flow circulates from the pump to the motor and back to the pump again, with only a comparatively small volume of oil being diverted from this closed loop for cooling purposes. Since in such a system any contamination in the loop will produce wear which in turn will produce more contamination, only the types of units generating the least amount of contamination have been successfully used, these having been piston-type pumps and motors, working in a pressurized circuit with a number of specialized accessories.

There is a large family of hydraulic motors of the non-piston type, which either due to their unique operating characteristics, low cost, or some other special features, are produced in very large quantities and used in open loop type hydrostatic transmission circuit, usually with a fixed displacement type pump. The control of the load in such a system is accomplished by means of throttling type direction control valves. Although usually the load control in such systems is not precise and the systems are inefficient, they are inexpensive and lend themselves to control not only of a single load, but a number of loads. The open loop system is also widely used for another, less obvious reason. Some of these high torque, low speed orbit-type hydraulic motors, some of the vane motors, and vane and gear pumps shed contaminants at a comparatively high rate. In an open loop circuit the full quantity of fluid is introduced into the pump from the reservoir, through suction filter or strainer, supplied to the motor and delivered from the motor back directly to the reservoir, usually through a return line filter. In this way, not only is the contamination generated by the motor never introduced directly into the pump inlet, but also contamination generated by the pump can pass only once through the motor. A mixed loop hydrostatic transmission system, according to this invention, retains the contamination free characteristics associated with the open loop circuit while retaining precise control of the closed loop hydrostatic tansmission system.

SUMMARY OF THE INVENTION

It is therefore a principal object of this invention to provide a new and improved mixed loop hydrostatic transmission system which retains the control characteristics of a closed loop system while providing contamination free operation of an open loop system.

Another object of this invention is to provide an improved mixed loop hydrostatic transmission system which provides an essentially open loop system with motor response proportional to the quantity and direction of pump flow.

It is another object of this invention to provide an improved mixed loop hydrostatic transmission system, which in an essentially open loop system provides complete synchronization between system pump and motor by throttling the fluid delivered from the motor exhaust.

It is a further object of this invention to provide an improved mixed loop hydrostatic transmission system which, while using an essentially open loop circuit, induces the full flow replenishment of the pump inlet fluid, by utilizing an inlet pressure boosting stage of an injector type using the pressure and kinetic energy of the motor outlet fluid.

It is a further object of this invention to provide an improved mixed loop hydrostatic transmission system, providing accurate control coupling of pump and motor of a closed loop hydrostatic transmission circuit, while permitting the use of fluid motors which generate contaminants.

Briefly, the foregoing and other additional objects and advantages of this invention are accomplished by providing a novel mixed loop hydrostatic transmission system, constructed according to the present invention, for use in hydrostatic transmission drives. A fluid pump and a fluid motor are coupled by a mixed loop hydrostatic transmission system in such a way that they are synchronized while normally full flow from the pump is supplied to the fluid motor, the full flow from the fluid motor is supplied through an outlet filter to the injector type inlet pressure boosting stage connected to the system reservoir, and an increased amount of fluid flow is supplied from the inlet pressure boosting stage to the fluid pump. In this way the contaminants generated by the fluid motor are never introduced into pump inlet.

DESCRIPTION OF THE PREFERRED EMBODIMENT

Figure 1:
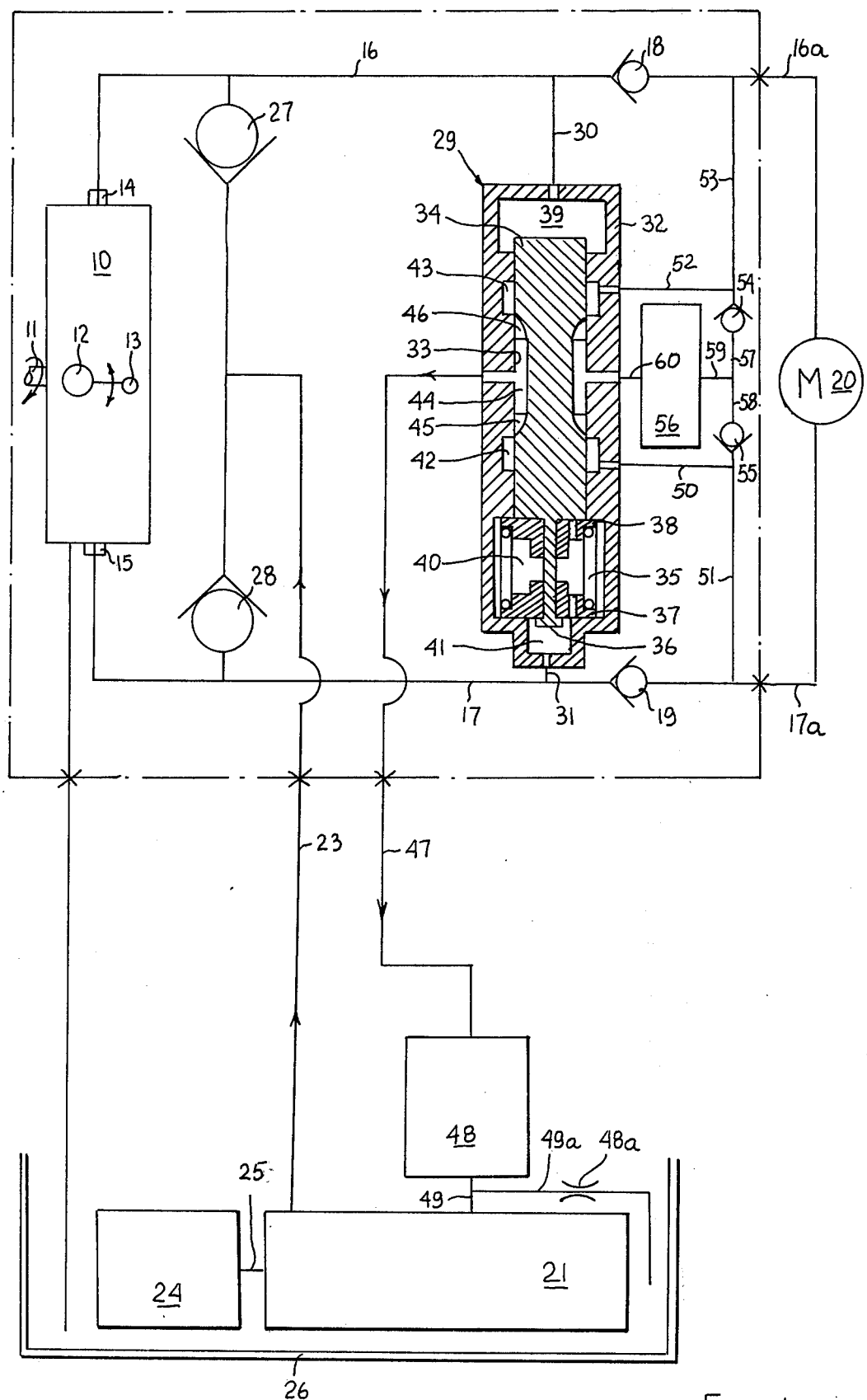
FIG. 1 is a diagramatic representation of a mixed loop hydrostatic transmission system, equipped with a fluid bypass and fluid throttling synchronizing valve.

Referring now to the drawings, and for the present to FIG. 1, a variable flow overcenter type pump generally designated as 10 is driven through shaft 11 by a prime mover (not shown) and is equipped with a flow changing mechanism 12, operated by a control lever 13. As is well known in the art, counterclockwise movement of the control lever 13 from its neutral zero flow position as shown in FIG. 1 will induce proportionally increasing flow supplied by the variable flow pump 10 to a pump port 14. Conversely, clockwise movement of the control lever 13 from its neutral position will induce proportionally increasing flow supplied by the variable flow pump 10 to a pump port 15. The pump ports 14 and 15 are connected through fluid conducting lines 16 and 17, check valves 18 and 19, and fluid conducting lines 16a and 17a to a fluid motor 20.

An injector venturi type pump inlet pressure booster stage 21 is connected by section line 23, a section strainer 24, and suction line 25 to system reservoir. The inlet pressure booster stage 21 is also phased by check valves 27 and 28 with the fluid conducting lines 16 and 17 respectively.

A bypass brake valve, generally designated as 29, is connected by lines 30 and 31 with fluid conducting lines 16 and 17. The bypass brake valve 29 has a housing 32, equipped with a bore 33, guiding a bypass brake spool 34. The bypass brake spool 34 is biased upwardly (as viewed in FIG. 1) towards the position as shown by a spring 35. The spring 35 is disposed between spring retainer 37 and spring retainer 38. During upward movement of the bypass brake spool 34, a stop 36 formed on the end thereof will engage the spring retainer 37 compressing the spring 35. During downward movement of the bypass brake spool 34, the stop 36 will disengage spring retainer 37 and the spring retainer 38 engaged by bypass brake spool 34 will compress the spring 35.

The housing 32 defines spaces 39, 40 and 41 and annular grooves 42 and 43. The space 39 directly communicates with the end of the bypass brake spool 34. The space 41 communicates with the end of the bypass brake spool 34 through drillings (unnumbered) in spring retainers 37 and 38, not shown. A reduced center portion of the bypass brake spool 34 defines in bore 33 an annular space 44. Throttling grooves 45 and 46 are located on the bypass brake spool 34, between annular grooves 42 and 43 and annular space 44 respectively. These grooves 45 and 46 are arcuate, radially spaced slots, as is well known in the art. The annular space 44 is connected by a return line 47, outlet filter 48 and return line 49 with the pump inlet pressure boosting stage 21. The annular groove 42 is connected through lines 50 and 51 to the fluid conducting line 17a. The annular groove 43 is similarly connected through lines 52 and 53 with the fluid conducting line 16a. Check valves 54 and 55 provide unidirectional flow between lines 53 and 51 and a system relief valve 56 is connected by lines 58, 57 and 59. The system relief valve 56 is connected through line 60 with annular space 44 of the bypass brake valve 29 and as a result through return line 47, outlet filter 48 and return line 49 to the pump inlet pressure boosting stage 21. Counterclockwise movement of the control lever 13 will induce a pressurized flow from the variable flow pump 10, through pump port 14, to fluid conducting line 16. In a well known manner, the check valve 18 will open, supplying the pressurized fluid through fluid conducting line 16a to a fluid motor 20. Simultaneously the pressurized fluid from fluid conducting line 16 will be transmitted through line 30 to space 39, where reacting on cross-sectional area of bypass brake spool 34 will cause the spool to move downward (as viewed in FIG. 1) against biasing force of the spring 35, connecting annular groove 42 with annular space 44. As a result the downstream port of the fluid motor 20 will be directly connected, through fluid conducting line 17a, lines 51 and 50, annular groove 42, annular space 44, return line 47, outlet filter 48 and return line 49 with the pump inlet pressure boosting stage 21. The check valve 19, in a well known manner, will block the flow between the conducting lines 17a and 17. The pressurized fluid conducting line 16a and therefore inlet of the fluid motor 20 is also connected through line 53, the check valve 54 and lines 57 and 59 to the system relief valve 56.

Inlet pressure booster 21 is capable of supplying full suction oil requirements of the variable pump 10. Pressure differential developed between the inlet pressure booster stage 21 and fluid conducting line 17, which with fluid conducting line 16 being pressurized becomes suction line of the variable pump 10, will open check valve 28. Then all the suction flow requirements of the variable flow pump 10 will be supplied from the inlet pressure booster stage 21, which through suction line 23, the suction strainer 24 and suction line 25 is connected to the system reservoir 26 and through return line 47 is connected with outlet flow of fluid motor 20. For cooling purposes part of fluid flow from outlet filter 48 is diverted through line 49a and restrictor 48a to the system reservoir 26. The make-up fluid is introduced to inlet pressure boosting stage 21 from reservoir 26 through suction strainer 24.

As long as the fluid motor 20 absorbs the power supplied by the variable flow pump 10, all of the flow from the variable pump 10 will be supplied to the fluid motor 20, all of the flow from the fluid motor 20 will be diverted to the outlet filter 48 and will supply inlet pressure boosting stage 21 and all of the inlet flow requirements of the variable flow pump 10 will be supplied by the inlet pressure booster stage 21 from the outlet flow from fluid motor 20 and from the system reservoir 26. If due to the resistance of fluid motor 20 the pressure in the fluid conducting lines 16 and 16a would exceed the setting of the system relief valve 56, the system relief valve 56 will open and part of the fluid flow from the variable flow pump 10 will be bypassed through line 53, check valve 54, lines 57 and 59, relief valve 56, annular space 44, return line 47, outlet filter 48 and return line 49 to the inlet pressure boosting stage 21.

An application of positive external driving torque to the fluid motor, or a reduction in pump flow will reduce the discharge pressure of the variable flow pump 10 to a level at which the spring 35 of the bypass brake valve 29 will start to return the bypass and brake spool 34 to its neutral position. Throttling groove 45 will start increasing the resistance to flow between annular groove 42 and annular space 44, throttling the return flow and providing a braking effect on the fluid motor 20. The throttling groove 45 has a variable area, permitting variation in resistance to the outlet flow of the fluid motor 20, with change in the bypass brake spool position. The magnitude of this braking effect and therefore the pressure in line 17a is limited by the system relief valve 56, which is connected to the source of pressure in fluid conducting line 17a through line 51, check valve 55 and lines 58 and 59. In a well known manner, the check valve 54 will close isolating line 57 from line 53. The braking effect, applied to the fluid motor 20, will lower its speed to a point, at which the flow requirement of the fluid motor 20 will match exactly the flow output of the variable flow pump 10. The resulting increase in the discharge pressure of the variable flow pump 10 will shuttle back the bypass brake spool 34 against bias of the spring 35 and connect the outlet of the fluid motor 20 with the system reservoir 26.

A very sudden and large reduction in the flow of the variable flow pump 10 will instantly lower the discharge pressure to a level at which the pressure differential between the inlet pressure booster stage 21 and fluid conducting line 16 will open check valve 27, connecting the inlet pressure booster stage 21, through check valve 18 and fluid conducting line 16a to the inlet of the fluid motor 20. The booster stage supplies pressure fluid at a minimal pressure, enough to prevent cavitation but well below the pressure equivalent of the spring 35, and the normal output pressure of the pump 10. The inlet requirements of the fluid motor 20 will then be supplied by the combined flow from the variable flow pump 10 and from the inlet pressure boosting stage 21. At the same time the resulting low pressure in the fluid conducting line 16, line 30 and space 39 will permit the bypass brake spool 34 to return to its neutral position, under action of the spring 35. With bypass brake spool 34 in its neutral position and the passage between annular groove 42 and annular space 44 fully blocked, full outlet flow of the motor will be bypassed through line 51, the check valve 55, lines 58 and 59 and the system relief valve 56 to the inlet pressure booster stage 21, decelerating the fluid motor 20 at a maximum rate until the flow requirements of the fluid motor 20 match exactly the output flow of the variable pump 10. Then, as previously described, the pressure in the fluid conducting line 16 will rise and the bypass brake spool 34 will reconnect the outlet of the fluid motor 20 with the inlet pressure booster stage 21.

In this way the mixed loop hydrostatic transmission circuit of FIG. 1 will maintain the output of fluid motor 20, proportional to flow output of the variable flow pump 10, within the range of positive driving effort and the full range of braking effort up to the maximum value, as determined by the setting of the system relief valve 56.

Because of the pressure developed in the inlet pressure booster stage 21 under normal operating conditions, no cavitation can take place in any part of the circuit.

The mixed loop system, as described above, is completely symmetrical since it performs in an identical way in both directions of the flow from the variable flow pump. Movement of the control lever 13 of the variable flow pump 10 from its neutral position in a clockwise direction will reverse the pump flow and pressurize the fluid conducting line 17. Fluid under pressure will then be transmitted through check valve 19 and fluid conducting line 17a to fluid motor 20, which in a well known manner, will reverse its direction of rotation, the fluid conducting line 17a being the motor inlet line. The fluid pressure conducted through line 31 to spaces 41 and 40 will react against the cross-sectional area of the bypass brake spool 34 and shuttle it upwards, against biasing force of the spring 35, connecting annular groove 43 with annular space 44 through throttling grooves 46. This action will connect the fluid conducting line 16a, leading from the fluid motor 20 through lines 53 and 52, annular groove 43, annular space 44, return line 47, outlet filter 48 and return line 49, to the inlet pressure boosting stage 21. Under action of the pressure differential existing between the inlet pressure booster stage 21, and fluid conducting line 16, the check valve 27 will open and the inlet pressure boosting stage 21 will supply full inlet flow requirements of the variable flow pump 10. Fluid to inlet pressure booster stage will be supplied from the fluid motor 20 and system reservoir 26 through suction line 25, suction strainer 24, and suction line 23.

Since as previously stated the arrangement of the control components of the mixed loop hydrostatic transmission system is completely symmetrical, all the other functions of braking and synchronization of speed between the fluid motor 20 and the variable flow pump 10 will be identical in both directions of rotation of fluid motor 20 and on each side of center of the flow changing mechanism 12 of the variable flow pump 10.

The performance characteristics of the mixed loop circuit, as described above, are exactly the same as those of a closed loop hydrostatic transmission, while full outlet flow of fluid motor 20 and full flow through the system relief valve 56 is being delivered through the outlet filter 48, connected to the inlet pressure boosting stage 21 and full suction flow for the pump is being supplied from the inlet pressure boosting stage 21 and from the system reservoir through the suction strainer 24. Therefore all the contaminants generated by the fluid motor 20 are trapped in the outlet filter 48 and cannot reenter the loop, and all the contaminants generated by the pump can only pass through the motor once.

With variable flow pump 10 brought into zero flow position, or with the transmission at rest, the bypass brake spool, biased by the spring 35, automatically blocks both fluid motor ports to provide so-called parking brake effect. Under these conditions, any leakage from the fluid motor 20 due to braking torque being applied to the motor is replenished from the system reservoir 26 through the inlet pressure boosting stage 21, depending on torque direction, either through check valve 27 or 28.

Figure 2:
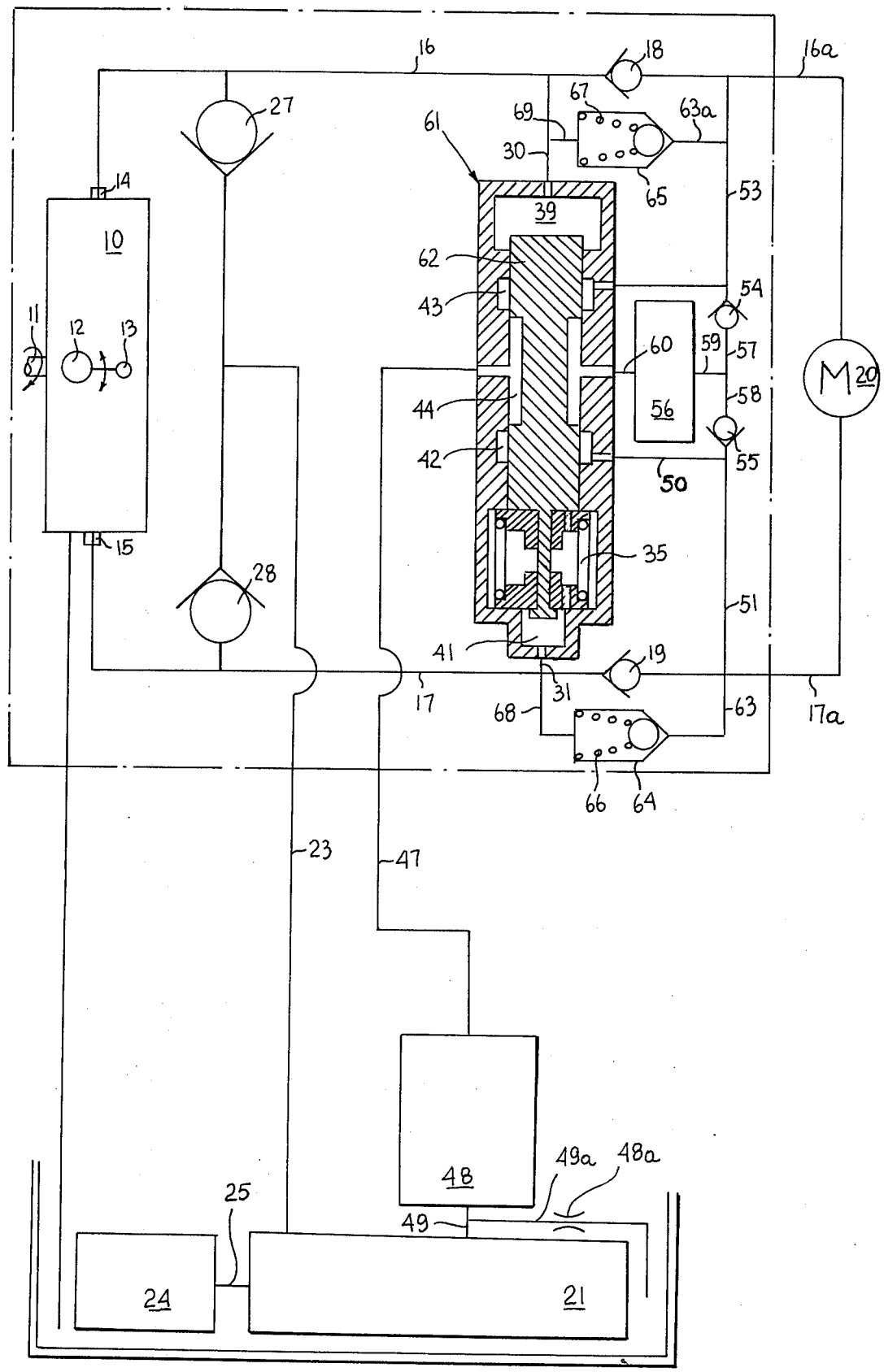
FIG. 2 is a diagramatic representation of a mixed loop hydrostatic transmission system, equipped with a fluid bypass valve, which permits full fluid exchange during transmission of positive load and which reverts to closed loop hydrostatic transmission system, in regenerative mode of operation.

Referring now to FIG. 2, a different type of mixed loop hydrostatic transmission drive circuit is shown. All the basic system components of FIG. 2 are identical to those of FIG. 1, with two exceptions. A bypass valve 61 differs from bypass brake valve 29 in that the throttling grooves 45 have been removed from the valve spool and two spring loaded check valves 64 and 65 have been connected in parallel circuit with the check valves 18 and 19. The spring loaded check valves 64 and 65 permit unidirectional fluid flow in the opposite direction to that of check valves 18 and 19.

As long as the fluid motor 20 absorbs the power supplied by the variable flow pump 10, the performance of mixed loop hydrostatic drives of FIGS. 1 and 2 is identical. The operation of those two systems, however, varies distinctly when the fluid motors are subjected to braking action or when they are subjected to regenerative loads.

With the control lever 13 turned counter-clockwise and the fluid conducting line 16 subjected to pressure, as previously described when referring to FIG. 1, pressurized fluid flow is supplied through check valve 18 and line 16a to fluid motor 20. Due to the direction of the fluid flow, the spring loaded check valve 65 remains closed. Fluid under pressure, conducted through line 30 to space 39, shifts the valve spool 62 downwards against bias of spring 35, cross-connecting annular groove 42 with annular space 44. The exhaust flow from the fluid motor 20 is transmitted through the fluid conducting line 17a, lines 51 and 50, annular groove 42, annular space 44, the return line 47, the outlet filter 48 and the return line 49 to the inlet pressure boosting stage 21. The fluid conducting line 17 is subjected to inlet pressure of the variable flow pump 10, supplied through check valve 28, by inlet pressure booster stage 21. Depending on the characteristics of the inlet pressure boosting stage 21, the pressure in the fluid conducting line 17 may be below atmospheric pressure. The spring loaded check valve 64 is subjected to a pressure differential existing between fluid conducting lines 17a and 17. The fluid conducting line 17a is subjected to pressure caused by the resistance to flow of the motor exhaust fluid including the resistance of the outlet filter 48 and resistance of inlet pressure boosting stage 21. The preload in the spring 66 is so selected that it will provide a higher opening pressure differential than the highest pressure differential that could exist between fluid conducting lines 17a and 17 with the fluid motor exhaust fluid being bypassed through the bypass valve 61 to the inlet pressure boosting stage 21.

Sudden reduction of the output flow of the variable flow pump 10, in respect to the flow requirements of the fluid motor 20, will lower the system pressure in the fluid conducting line 16. The check valve 27 will open, connecting the inlet pressure boosting stage 21 to motor inlet to satisfy higher inlet flow demand of the fluid motor 20 than the variable flow pump 10 can supply. Simultaneously the valve spool 62, activated by spring 35, will return to its neutral position, isolating annular groove 42 from annular space 44. The outlet of the fluid motor 20 will become isolated from the system reservoir 26. As a result, rising pressure in the fluid conducting line 17a and line 63 will overcome preload of spring 66, of spring loaded check valve 64, permitting flow from outlet of the fluid motor 20 through fluid conducting line 17 to the inlet port 15 of the variable flow pump 10. In a well known manner, the variable flow pump 10 will become a fluid motor, feeding the power through shaft 11 back into the prime mover and thus providing a braking effect for the fluid motor 20.

If during the braking operation the system pressure exceeds the setting of the system relief valve 56, as previously described, part of the flow from the fluid motor 20 will be diverted through the system relief valve 56 to the inlet pressure boosting stage 21, the fluid motor 20 being decelerated at a maximum rate. Under these conditions the inlet pressure booster stage 21 will supply through check valve 27, into fluid conducting line 16 and therefore into the motor inlet, a flow consisting of the flow through the relief valve 56 and the system leakage.

Once the resulting braking torque has lowered the speed of the fluid motor 20 to a point at which the motor flow requirements match exactly the flow output of the variable flow pump 10, the resulting increase in the outlet pressure of the variable flow pump 10 will shift the bypass valve 61 connecting, in a manner as previously described, the outlet of the fluid motor 20 with the system reservoir 26.

With the variable flow pump 10 brought into zero flow position, or with the transmission at rest, the valve spool 62 biased by spring 35 automatically blocks both fluid motor ports to provide so-called parking brake effect. Under these conditions any leakage from the fluid motor 20 due to braking torque being applied to the motor is replenished from the system reservoir 26 through inlet pressure boosting stage 21, depending on the torque direction, either through check valve 27 or 28.

Since, as previously stated, the arrangement of the control components of the mixed loop hydrostatic transmission system is completely symmetrical, all the other functions of braking and synchronization of speed between the fluid motor 20 and the variable flow pump 10 will be identical in both directions of rotation of fluid motor 20 and on each side of center of the flow changing mechanism 12 of the variable flow pump 10.

As long as fluid motor 20 absorbs the power supplied by the pump, all the flow from fluid motor will be directed to the outlet filter 48 connected to the inlet pressure booster stage 21 and all of the inlet flow requirements of the variable flow pump will be supplied by the inlet pressure booster stage from the outlet filter 48 and the reservoir 26, the system basically utilizing the principle of open loop circuit. However, once the inlet flow requirement of the fluid motor 10 momentarily exceeds the flow output of the variable flow pump, all of the flow from the motor will be supplied directly to the variable flow pump inlet, providing dynamic braking of the system, the system reverting automatically to the principle of closed loop circuit.

In a typical hydrostatic transmission circuit, driving even a partially absorptive load, only a very small percentage of time is used in dynamic braking. Therefore, when using the mixed loop circuit of FIG. 2, the time used in open loop operation will by many times greater than that used in the closed loop. In the same proportion the effect of the contaminants generated by the motor on the life of the pump will be reduced. There exists still another factor which will further reduce the wear of the pump working in this circuit. During each switch from open to closed loop circuit and back again the system is completely flushed with clean oil, the build-up of contaminants with the loop never reaching a significant level.

Figure 3:
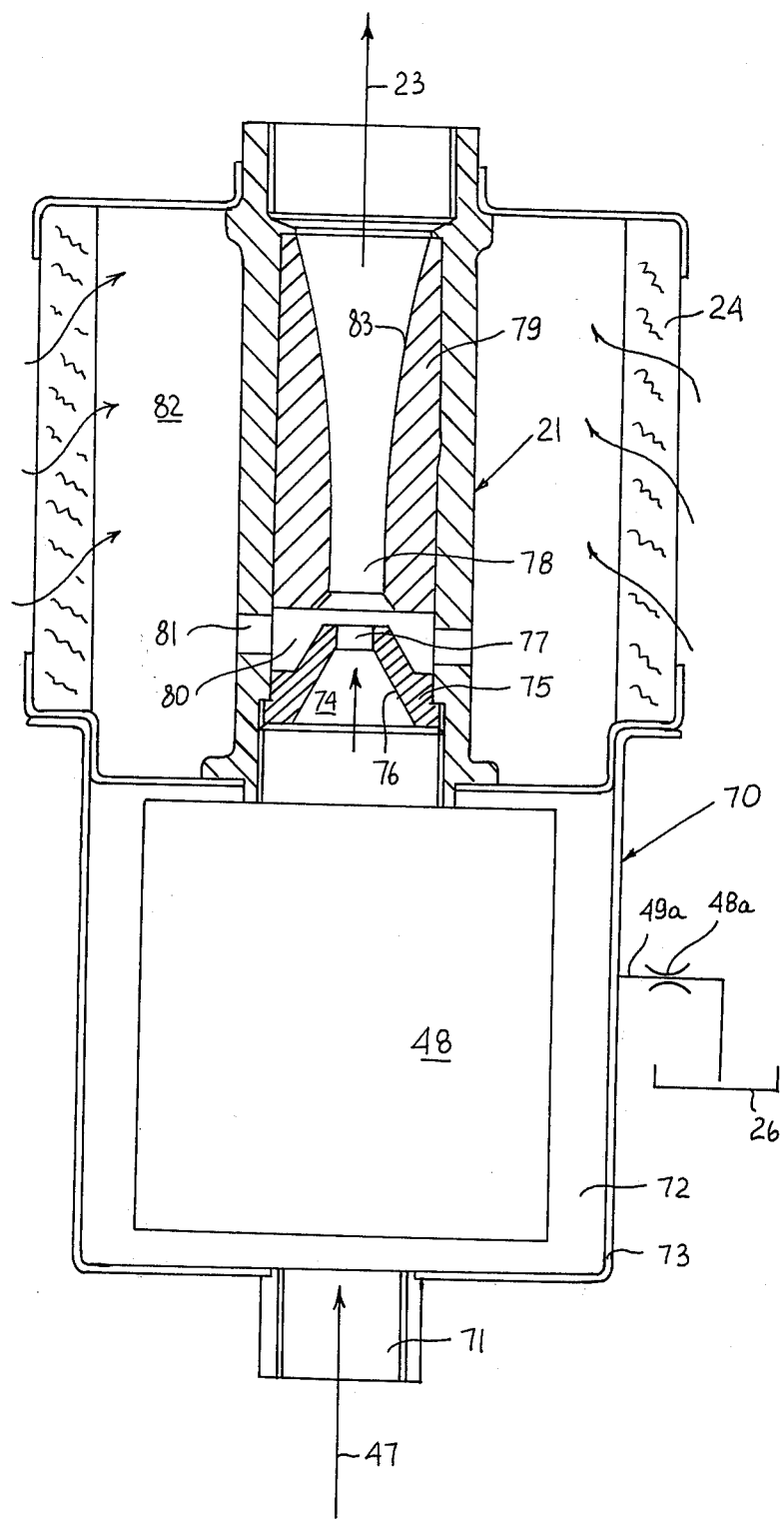
FIG. 3 is a section through a venturi type inlet pressure boosting stage integrated into one unit with motor outlet filter and pump suction filter.

Referring now to FIG. 3 a pump inlet pressure boosting stage, generally designated as 70, is composed of an injector inlet boosting stage, generally designated as 21, the outlet filter 48 and the inlet filter 24. The inlet pressure boosting stage would normally be located below the fluid level of the reservoir 26, see FIGS. 1 and 2 and connected to return line 47 and suction line 23. Exhaust fluid conducted by the return line 47 from the outlet port of fluid motor 20 is introduced through port 71 to space 72 defined by a container 73 in which the outlet filter 48 is located. The exhaust fluid from space 72 flows through the filtering media of outlet filter 48 and is introduced to space 74 within a nozzle 75 of injector inlet boosting stage 21. In a well known manner a converging surface 76 leading to an orifice 77 converts fluid pressure energy into kinetic energy resulting in a high velocity jet of fluid being ejected through the orifice 77. This high velocity jet of fluid enters an inlet 78 of a diffuser 79 entraining within its flow a quantity of oil contained in space 80 connected by openings 81 with inside space 82 of suction filter 24. The diffuser 79 is provided with diverging diffusing surface 83 which in a well known manner converts kinetic energy of high velocity flow into pressure energy. Therefore pressurized fluid flow from outlet port of fluid motor 20 conducted by return line 47 is filtered by the outlet filter 48 while a selected quantity of this flow is diverted for circuit cooling purposes through line 49a and restrictor 48a directly to the system reservoir. Pressurized fluid flow from the outlet filter 48 passes through the injector inlet boosting stage 21 which supplements the flow passing through outlet filter 48 by fluid drawn from reservoir through the inlet filter 24 and delivers to suction line 23 a larger quantity of flow at a lower pressure. Therefore through the action of the injector inlet boosting stage 21 the pump inlet is maintained at a positive pressure level and supplied with the required quantity of fluid, which constitutes a mixture of motor outlet fluid filtered through the outlet filter 48 and reservoir fluid filtered through the suction filter 24.

Figure 4:
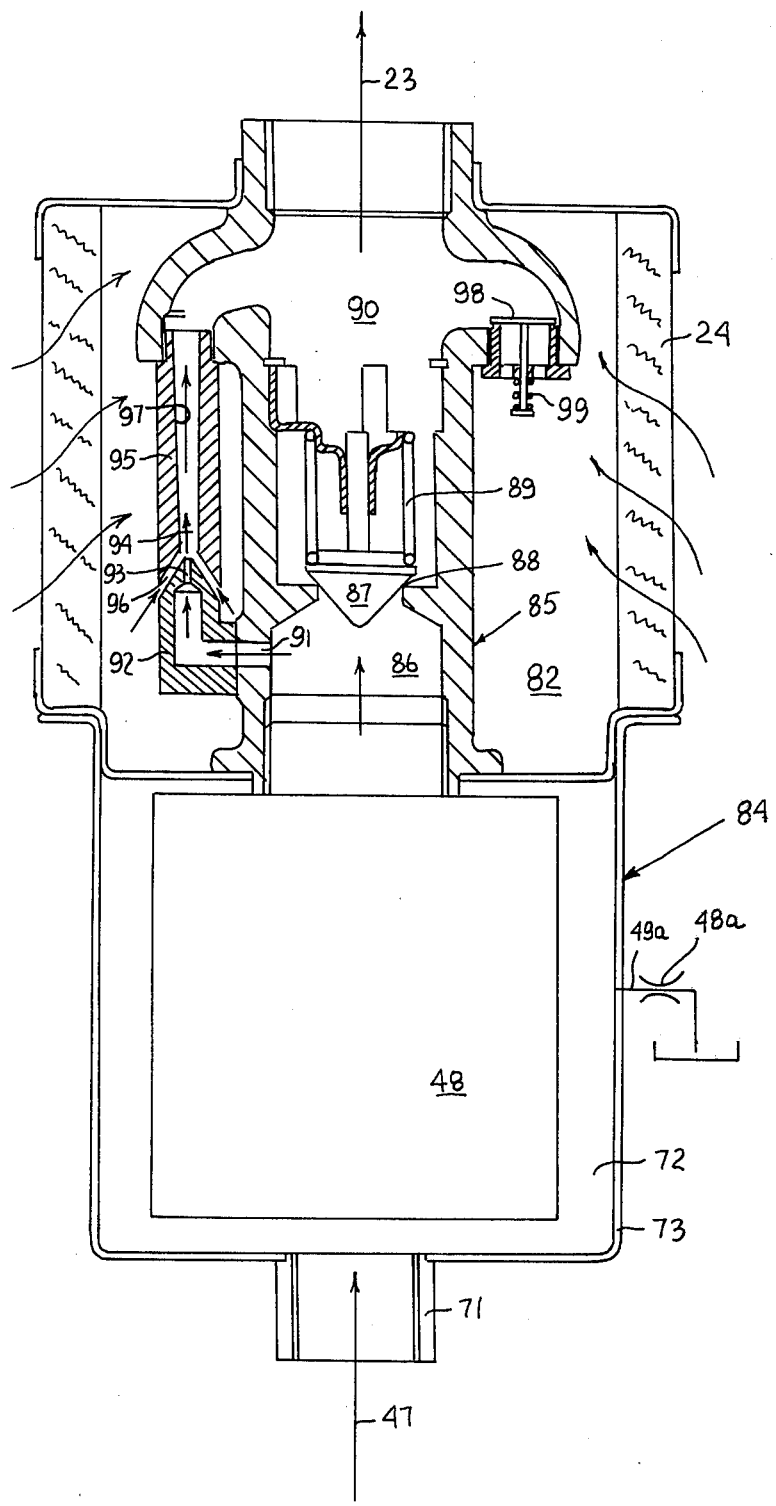
FIG. 4 is a section through another embodiment of venturi type inlet pressure boosting stage integrated into one unit with motor outlet filter and pump suction filter.

Referring now to FIG. 4 a pump inlet pressure boosting stage, generally designated as 84, is composed of an injector inlet boosting stage, generally designated as 85, the outlet filter 48 and the inlet filter 24. The inlet pressure boosting stage 84 is similarly constructed as the inlet pressure boosting stage of FIG. 3, the injector inlet boosting stage 85 of FIG. 4 being different from the injector inlet boosting stage 21 of FIG. 3. The pressurized oil from the outlet filter 48 is supplied to space 86 where it reacts on the effective area of a relief valve poppet 87 maintained in contact with seat 88 by a relief valve spring 89. The back surface of the poppet 87 is subjected to pressure in space 90 which is connected by suction line 23 to the inlet port of variable pump 10, see FIGS. 1 and 2. In a well known manner the relief valve poppet 87 subjected to pressure differential existing between spaces 86 and 90 will move away from seat 88 providing a direct flow passage between space 86 and space 90 and regulating the area of this passage to maintain a constant pressure differential between spaces 86 and 90 as dictated by the preload in the relief valve spring 89. Fluid under pressure from space 86 is conducted through passage 91 to a nozzle 92 from which it is ejected through an orifice 93 as a high velocity low pressure jet into opening 94 of a diffuser 95. High velocity jet ejected from the orifice 93 entrains fluid contained in passage 96 communicating with space 82 within the inlet filter 24. Diverging diffusing surface 97 of the diffuser 95 converts kinetic energy of the flowing fluid into pressure energy, maintaining space 90 at a positive pressure level. The exit pressure from the diffuser 95 establishes the pressure level in the space 90 which in turn directly influences pressure in the space 86 since a constant pressure differential is maintained between spaces 86 and 90 by the action of the relief valve poppet 87. Increase in pressure in space 86 will in turn through action of the nozzle 92 and the diffuser 95 increase the pressure in space 90 until a point of equilibrium is reached at which the volume of entrained fluid and the friction losses in the diffuser will balance the pressure differential. As long as a sufficient quantity of fluid is supplied to the nozzle 92 space 90 will be maintained at a positive pressure level. However, at very low flow levels of the variable flow pump the volumetric loss of the fluid in the system and the flow of the fluid diverted from space 72 through line 49a and restrictor 48a to system reservoir for cooling purposes may exceed the capability of the injector to introduce sufficient flow from the system reservoir into space 90 to maintain it at a positive pressure level. Under these conditions the pressure in space 90 will drop below atmospheric pressure and in a well known manner a suction check valve 98 will open against bias of a spring 99 providing a passage between space 82 and space 90. Under these conditions at very low pump flows part or all of the pump flow will be supplied through suction filter 24 from system reservoir, space 82 being maintained in direct communication with space 90 by the suction check valve 98.

The injector of FIG. 4 is similar in its basic principle of operation to the injector of FIG. 3, but is more efficient and is capable of maintaining higher pressure levels at the pump inlet through a wider range of variation in the pump inlet flow requirements. With the injector of FIG. 3 high pump inlet pressures are generated at high pump flows, drop in the pump flow drastically reducing pump inlet pressure. With the injector of FIG. 4 only a small volume of fluid is diverted through the injector the rest being delivered through the injector relief valve which maintains the injector pressure at a certain minimum pressure level through a wide variation in the pump inlet flow requirements.

Although preferred embodiments of this invention have been shown and described in detail it is recognized that the invention is not limited to the precise forms and structure shown, and various modifications and rearrangments as will readily occur to those skilled in the art upon full comprehension of this invention may be resorted to without departing from the scope of the invention as defined by the claims.

What is claimed is:

1. A fluid power transmission and control system having a variable delivery fluid pump and a fluid motor, fluid conducting means between said variable delivery fluid pump and said fluid motor, the improvement which comprises a fluid distributing and control system interposed between said variable delivery fluid pump and said fluid motor said distributing and control system having motor exhaust fluid bypass means to selectively bypass full flow of motor exhaust fluid past said fluid conducting means, said motor exhaust fluid bypass means including motor exhaust fluid diverting means, fluid reservoir means and motor exhaust flow boosting means and means for phasing full suction flow requirement of said variable delivery fluid pump from said motor exhaust flow boosting means to said variable delivery fluid pump.

2. A fluid power transmission and control system as set forth in claim 1 wherein said fluid distributing and control system has fluid motor speed synchronizing means responsive to pressure in the fluid supplied from said variable delivery fluid pump to said fluid motor.

3. A fluid power transmission and control system as set forth in claim 1 wherein said motor exhaust fluid diverting means has means responsive to pressure in the fluid supplied from said variable delivery fluid pump to said fluid motor.

4. A fluid power transmission and control system as set forth in claim 1 wherein said motor exhaust fluid bypass means has deactivating means responsive to pressure in the fluid supplied from said variable delivery fluid pump to said fluid motor.

5. A fluid power transmission and control system as set forth in claim 1 wherein said means for phasing full suction flow requirement of said variable delivery fluid pump from said motor exhaust flow boosting means includes check valve means.

6. A fluid power transmission and control system as set forth in claim 1 wherein said motor exhaust flow boosting means has fluid inductor means to increase fluid flow from said fluid motor to supply full suction flow requirement of said variable delivery fluid pump.

7. A fluid power transmission and control system as set forth in claim 1 wherein said motor exhaust flow boosting means includes outlet filter means to filter motor exhaust flow, fluid injector means to supplement motor exhaust fluid flow with suction fluid flow from said fluid reservoir means and suction filter means to filter said suction fluid flow.

8. A fluid power transmission and control system as set forth in claim 1 wherein said motor exhaust flow boosting means has motor exhaust pressure regulating means and fluid inductor means to supply full suction flow requirements of said variable delivery fluid pump with pressurized fluid.

9. A fluid power transmission and control system as set forth in claim 6 wherein said fluid inductor means includes nozzle means connected to said fluid motor exhaust flow, diffuser means having an inlet and outlet means and operable to supply full suction flow requirements of said variable delivery fluid pump and suction flow inducing means operably connected to said fluid reservoir means and positioned between said nozzle means and said diffuser means.

10. A fluid power transmission and control system as set forth in claim 9 wherein said fluid inductor means includes motor exhaust pressure regulating means and check valve means connecting for one way fluid flow said fluid reservoir means and said outlet means of said diffuser means.

\* \* \* \* \*